Jan. 30, 1962  M. C. LOGAN ET AL  3,019,410
WIRE-TO-WIRE CONNECTION
Filed Oct. 12, 1959
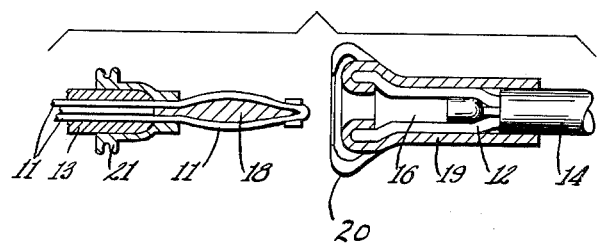
INVENTORS
MAURUS C. LOGAN
DAVID J. CRIMMINS
BY
ATTORNEY

United States Patent Office 3,019,410
Patented Jan. 30, 1962

3,019,410
WIRE-TO-WIRE CONNECTION
Maurus C. Logan, Elizabeth, and David J. Crimmins, Nutley, N.J., assignors to The Thomas & Betts Co., Elizabeth, N.J., a corporation of New Jersey
Filed Oct. 12, 1959, Ser. No. 845,712
2 Claims. (Cl. 339—253)

Many electronic circuits are designed to operate on small "power inputs" that cannot tolerate any high resistance joints. The so-called "dry" circuit is one that must operate on 30 millivolts ($30/1000$ of 1 volt, or $1/50$ of the voltage of a 1½ volt flashlight battery) and 10 milliamps. ($10/1000$ of 1 ampere—and a 2 cell flash-light bulb uses 200 milliamps.). This is such a small amount of power that thin oxide films or "tarnish" on metal would make the circuit inoperative.

This invention enables a wire-to-wire connection to be made such that the wires will be united without intermediate elements and will be in direct contacting, positive electrical connection with minimal power loss. The invention provides essentially homogeneous connections of wire-to-wire so that substantially no resistance to current flow is encountered in use and reliability is greatly enhanced.

The drawings, illustrating procedures and devices useful in carrying out the invention, and the description below, are exemplary only of the invention, which shall be deemed to cover all other devices and procedures coming within the scope and purview of the appended claims.

In the drawings, the FIGURE shows a fragmentary, sectional, partly elevational view of wire terminals embodying the invention, shown disconnected.

As shown in the drawing, the invention is useful for the rapid and effective connection and disconnection of the terminals 11 and 12 of cables 13, 14 with a minimum power loss, terminals 11, 12 being a plurality of strands wound to cable form or in any other form. Pursuant to the invention, means are provided for direct conductor-to-conductor connection of the wire terminals 11, 12 without use of any extraneous conducting means, thereby essentially eliminating resistance to the flow of current from one terminal to the other.

The terminal 11, at the free end thereof, is soldered, friction-fitted or otherwise closed upon an internal form 18 to impart a bowed longitudinal sectional outline to said terminal end 11 and to thereby enhance the direct conductor-to-conductor connection effected pursuant to the invention. The second terminal 12, comprising a strand cable held within a forming shell 19, defines an elongated axial opening 16 to receive the first terminal 11 in direct conductor-to-conductor contact connection; the terminals 11 and 12 are thus connected directly.

Latching means are provided as for example, the latch shell 20 on the sleeve 19 fixed to cable 14 adjacent the free end thereof and beyond the plane of the terminal proper for complementary engagement with latching means 21 on the terminal 11 adjacent the free end and beyond the plane thereof.

Having thus described our invention, what we claim as new and desire to secure by Letters Patent is:

1. A wire-to-wire connection for the terminal ends of a pair of multi-strand electric cables, comprising means maintaining the strands of one cable bowed in a direction transverse to the longitudinal axis of said cable, latching means on said cable end exteriorly thereof, latching means on an end of the second cable exteriorly thereof, means on said end of the second cable maintaining the wire strands thereof in position to provide a recess in the direction of the longitudinal axis thereof proportioned to frictionally receive the bowed strands of the first mentioned cable when positioned thereagainst, said latching means on one of said cable ends being formed in inwardly spaced relation to said end thereof and said complementary latching means on the other cable end being formed to extend beyond said end thereof, the parts being so proportioned that said latching means will be aligned for interengagement to latch the cable ends together when the bowed strands of said first mentioned cable are inserted into said recess at said end of the other cable.

2. A wire-to-wire connection as set forth in claim 1, wherein said means maintaining the strands of one cable bowed comprises an internal form of bowed longitudinal sectional outline positioned within the end of the first cable to reenforce and maintain said strands in bowed outline for being so frictionally received in the axial end recess of the second cable.

References Cited in the file of this patent

UNITED STATES PATENTS

| | | |
|---|---|---|
| 317,887 | Thompson | May 12, 1885 |
| 1,486,560 | Becker | Mar. 11, 1924 |
| 2,034,512 | Geiger et al. | Mar. 17, 1936 |
| 2,124,461 | Challet | July 19, 1938 |
| 2,310,212 | Buchanan | Feb. 9, 1943 |
| 2,585,010 | Hickman et al. | Feb. 12, 1952 |
| 2,792,560 | Bollmeier | May 14, 1957 |

FOREIGN PATENTS

| | | |
|---|---|---|
| 20,445 | Great Britain | Sept. 19, 1902 |
| 931,634 | France | Nov. 3, 1947 |
| 708,468 | Great Britain | May 5, 1954 |
| 1,064,688 | France | May 17, 1954 |